Jan. 9, 1968 A. A. MALHERBE 3,362,727
SYSTEM FOR IMPARTING TRANSVERSE STABILITY TO A TOWED VEHICLE
Filed Feb. 14, 1966

United States Patent Office 3,362,727
Patented Jan. 9, 1968

3,362,727
SYSTEM FOR IMPARTING TRANSVERSE
STABILITY TO A TOWED VEHICLE
André Alfred Malherbe, 21 Rue Pasteur,
Waziers, Nard, France
Filed Feb. 14, 1966, Ser. No. 527,249
Claims priority, application France, Apr. 13, 1965,
12,939, Patent 1,441,568
3 Claims. (Cl. 280—446)

ABSTRACT OF THE DISCLOSURE

A towed vehicle is stabilized by a cross member secured to the vehicle or its tractor with a pulley loosely mounted at one end of the cross member and a shaft at the other end of the cross member supporting a second pulley. Pressure is exerted against the second pulley and a regulating knob on the shaft opposes the pressure. A flexible tie passes over the two pulleys and is attached by either end of the other one of the two vehicles.

---

When a trailer such as a caravan is towed by a motor vehicle, it constantly tends to swing about vertical axes owing to the asymmetrical pressure of the air and the inertia effect resulting from the uneveness of the road surface. When the towing vehicle reaches a speed of about 80 kilometers per hour, at which the lifting force becomes considerable and consequently reduces adhesion to the ground, the trailer is subjected to accentuated snaking movements which are transmitted to the vehicle and compromise the stability of the assembly. If this snaking movement becomes too accentuated, a serious accident could occur since the "road-holding" of the towing vehicle is distinctly impaired. Further, this phenomenon leads to rapid wear on the tyres and unduly high fatigue in the mechanical components of the coupling between the towing vehicle and the trailer, which could also lead to an accident through snapping of the coupling. These various reasons usually make it necessary to limit the speed to a fairly low figure.

It is known to absorb such parasite motion by means of telescopic hydraulic dampers of the kind commonly used in the automobile engineering art, which are mounted between the towing vehicle and the trailer, close to the coupling member. However, this arrangement has the disadvantage of being costly and difficult to install.

It is the object of the present invention to overcome these drawbacks by providing a system for imparting transverse stability to a trailer towed by a motor vehicle, said system consisting of at least one steel rope which has its end rigidly attached to one of the two vehicles, on either side of the longitudinal centerline thereof, and which cooperates with at least one energy absorbing device fixed to the other vehicle. Thus, any pivotal motion of the vehicles relatively to each other causes the steel rope to be displaced relatively to the energy absorbing unit or units, which in turn operate by restraining such movement and damping the parasite reactions of the towed vehicle on the towing vehicle, whereby a semi-rigid coupling is provided between the two vehicles that does not hinder maneuvering or the negotiation of bends and which enables high speeds to be maintained in complete safety on straight roads.

The energy absorbing units may be conventional adjustable or non-adjustable disc brakes or drum brakes. Alternatively, fluid friction type devices may be used.

In a preferred form of embodiment of the invention, said steel rope winds round two drums which are mounted on the ends of a cross-member rigidly connected to the chassis of the towed vehicle and at least one of which is coupled to an energy absorbing unit. Each drum is preferably formed with a helical groove thereon. The ends of the steel rope are in that case connected to the towing vehicle, preferably through the medium of conventional attachment means, such as chains of adjustable length for facilitating fitting and removal.

Whilst the locations of the attachment points of the ends of the steel rope may be chosen as desired, it will be advantageous for them to be positioned symmetrically with respect to the longitudinal centerline of the towing vehicle and as distant as possible therefrom.

This form of embodiment of the invention effectively absorbs undesirable snaking motion, eliminates its detrimental effect and authorizes higher driving speeds without adversely affecting safety. This arrangement has the additional advantage of being inexpensive, robust and extremely simple to fit. Further, it acts as a substitute for the compulsory safety chains and acts as a safeguard if the coupling snaps.

The description which follows with reference to the accompanying non-limitative exemplary drawings will give a clear understanding of how the invention can be carried into practice.

Figure 1:
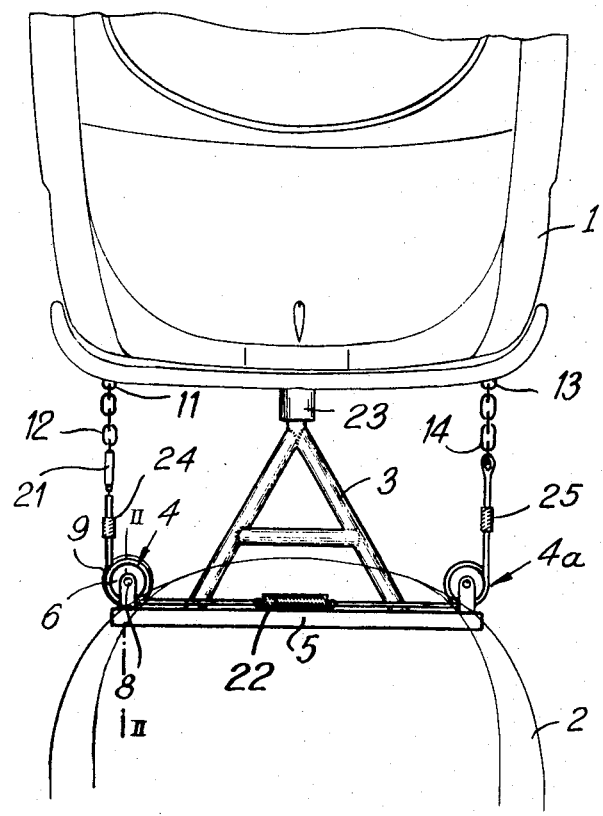
FIG. 1 is a schematic top view of a caravan coupled to a motor vehicle and fitted with a stabilization system according to the invention.
Figure 2:
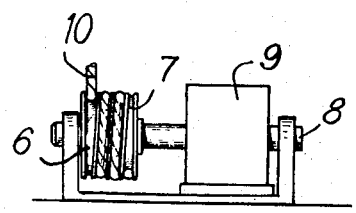
FIG. 2 is a schematic section of an enlarged scale taken through the line II—II of FIG. 1.

Reference is made to FIGS. 1 and 2 for an illustration of the system of the invention for stabilizing the coupling between a towing vehicle 1 and a caravan 2, said coupling being made through the agency of a known type of coupling 3. The system according to the invention comprises an energy absorbing unit 4 and a pulley 4a mounted respectively adjacent the two ends of a cross-member 5 located at the front of the caravan and rigidly connected to the chassis thereof.

In the constructional form shown in FIGS. 1 and 2, the energy absorbing unit 4 is a drum 6 formed with a helical groove 7 thereon and mounted on a vertical shaft 8 rigid with a disc or drum type braking device 9 of known design, providing an adjustable opposing torque. A steel rope 10 is attached at one end to the rear of vehicle 1, at a point 11 rigid with its chassis and as distant as possible from its longitudinal centerline. A chain 12 of adjustable length may if desired be connected between the end of cable 10 and vehicle 1. Said rope winds into groove 7 on drum 6 mounted on one end of cross-member 5; it then runs over pulley 4a and returns symmetrically to the vehicle 1, to which its other end is attached at a point 13 rigid with the vehicle chassis and located symmetrically to point 11 with respect to the longitudinal centerline of the vehicle. A chain 14 or any convenient fastening device may likewise be connected between this end of the rope and the vehicle.

It will be appreciated that should the caravan 2 tend to swing about its coupling hook, the rope 10 will cause drum 6 to rotate, but that this rotation will be restrained by the energy absorbing unit 9 operatively connected to the drum, whereby parasite movements are attenuated and the risk of an adverse effect on roadholding is avoided.

A turnbuckle 21 is interposed between the rope 10 and either of chains 12 or 14 to facilitate adjustment of the length of the system.

Conveniently, the steel rope may include at a point along its length a powerful coil spring 22 set under tension whereby to take up any slack in the rope when an inertia type restraining device 23 mounted on the coupling 3 operates as a result of the brakes of the towing vehicle being suddenly applied.

Two further springs of lesser strength 24 and 25, likewise connected into the steel rope though on either side of the energy absorbing unit, are effective in taking up the slack in the rope that occurs on one side when negotiating a turn in that direction.

Figure 3:
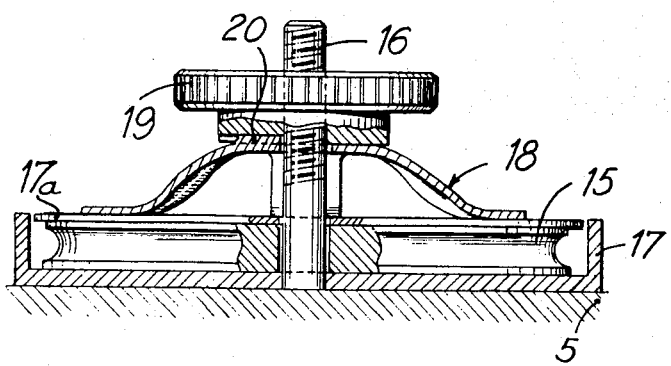
FIG. 3 shows diagrammatically an alternative constructional form for the system shown in FIG. 2.

In the constructional form shown in FIG. 3, the helically grooved drum 6 is replaced by a single pulley 15 mounted on a shaft 16 having its free end threaded and its other end rigidly connected to a plate 17 forming part of a frame secured in any convenient manner to cross-member 5. The rotation of pulley 15 is restrained by a pressure exerting member 18 consisting of a dished washer formed with a resilient radial surface which presses, through the medium of a plate 17a forming part of said frame, against that face of pulley 15 which is remote from plate 17. The member 18 is secured in position and compressed by a milled thumbscrew 19 screwed on to the threaded end of shaft 16. Member 18 is formed with radial ribs 20 which engage with notches formed on the adjacent surface of thumb screw 19 whereby to permit positive tightening by engagement of the successive notches.

It goes without saying that many detail modifications may be made to the forms of embodiment hereinbefore described without departing from the scope of the invention. By way of example, the energy absorption function in the unit 9 could be performed by fluid friction, for instance by means of a club-propeller rotating in a small oil reservoir. Similarly, the steel rope 10 could be replaced by a chain, in which case drum 6 and pulley 4a would be in turn replaced by sprockets in order to prevent slip between the chain and the energy absorbing device 4. A further possibility could be for the energy absorbing device 4 to be fixed to the towing vehicle and the ends of the steel rope to be secured to the caravan. Again, the ends of rope 10 could be fixed directly to one of the two vehicles, with the chain or chains 12, 14 being connected into the rope, between the devices 4 and 4a. Further, pulley 4a could be dispensed with an the energy absorbing device 4 could be positioned in the middle of cross-member 5.

What I claim is:

1. A system for imparting transverse stability to a vehicle towed by a towing vehicle, comprising, in combination, a cross-member rigid with one of said vehicles, a first pulley loosely mounted at one end of said cross-member, a fixed shaft with a threaded end rigidly connected to the other end of said cross-member, a second pulley rotatably mounted on said shaft, a resilient pressure exerting member thrusting against said second pulley, a knurled tightening knob screwed on to the threaded end of said shaft in opposition to said resilient pressure exerting member, means for permitting stepwise tightening, and a flexible tie engaging over said pulleys and having its two ends removably attached to the other of said vehicles, on either side of the longitudinal axis thereof.

2. A system as claimed in claim 1, wherein said flexible tie includes a steel rope, two chains extending the same at both ends thereof, a turnbuckle connected into said flexible tie, and a slackness compensating spring and two slackness recovering springs likewise connected into said flexible tie.

3. A system for imparting transverse stability to a vehicle towed by a towing vehicle, comprising, in combination, a cross-member fast with the towed vehicle, a first pulley loosely mounted at one end of said cross-member, a fixed shaft with a threaded end rigidly connected to the other end of said cross-member, a second pulley rotatably mounted on said shaft, a resilient pressure exerting member bearing against said second pulley, a knurled tightening knob screwed on to the threaded end of said shaft in opposition to said resilient pressure exerting member, means for permitting stepwise tightening of said knob, a steel rope engaging over said pulleys, two chains extending said rope at both ends and having their free ends removably attached to the towing vehicle at two point symmetrically located with respect to the longitudinal axis thereof, and a turnbuckle connected into the flexible tie formed by said steel rope extended by said chains.

References Cited

UNITED STATES PATENTS

| | | | |
|---|---|---|---|
| 223,773 | 1/1880 | Strunk | 242—155 X |
| 751,576 | 2/1940 | Veeder. | |
| 2,612,382 | 9/1952 | Landis | 280—456 |
| 2,714,494 | 8/1955 | Wentz | 242—155 |
| 2,756,072 | 7/1956 | Koontz | 280—405 |
| 3,259,336 | 7/1966 | Hibbard | 242—155 X |
| 3,305,246 | 2/1967 | Gonczy et al. | 280—446 |

LEO FRIAGLIA, *Primary Examiner.*